United States Patent
Wada et al.

(10) Patent No.: US 9,045,002 B2
(45) Date of Patent: Jun. 2, 2015

(54) AXLE SUPPORT STRUCTURES FOR INDUSTRIAL VEHICLES

(71) Applicant: KABUSHIKI KAISHA TOYOTA JIDOSHOKKI, Kariya-shi, Aichi-ken (JP)

(72) Inventors: Kenichi Wada, Kariya (JP); Akira Mochizuki, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/068,730

(22) Filed: Oct. 31, 2013

(65) Prior Publication Data
US 2014/0145409 A1 May 29, 2014

(30) Foreign Application Priority Data
Nov. 2, 2012 (JP) ................. 2012-242738

(51) Int. Cl.
*B62D 49/08* (2006.01)
*B60B 35/18* (2006.01)
*B60B 35/02* (2006.01)
*B60G 9/02* (2006.01)

(52) U.S. Cl.
CPC ............... *B60B 35/18* (2013.01); *B60B 35/02* (2013.01); *B60Y 2200/15* (2013.01); *B60G 9/02* (2013.01); *B60G 2200/322* (2013.01); *B60G 2204/15* (2013.01); *B60G 2206/60* (2013.01); *B60G 2300/022* (2013.01)

(58) Field of Classification Search
CPC ............ B60G 9/02; B60G 2200/326
USPC ............... 280/124.111, 755, 757, 759, 6.154
See application file for complete search history.

(56) References Cited

U.S. PATENT DOCUMENTS

| | | | | |
|---|---|---|---|---|
| 2,073,873 A | * | 3/1937 | Kliesrath | 267/258 |
| 3,811,699 A | * | 5/1974 | Casey | 280/124.111 |
| 4,471,975 A | * | 9/1984 | Sorlie et al. | 280/759 |
| 5,238,262 A | * | 8/1993 | Nunes | 280/681 |
| 5,938,238 A | * | 8/1999 | Lamb | 280/755 |
| 6,068,275 A | * | 5/2000 | Chino | 280/124.112 |
| 6,357,766 B1 | * | 3/2002 | Hall et al. | 280/6.15 |
| 7,204,499 B2 | * | 4/2007 | Miyake et al. | 280/124.111 |
| 7,303,199 B2 | * | 12/2007 | Chen | 280/87.041 |
| 7,740,254 B2 | * | 6/2010 | Takemura et al. | 280/124.111 |
| 2004/0217571 A1 | | 11/2004 | Miyake et al. | |

(Continued)

FOREIGN PATENT DOCUMENTS

| | | |
|---|---|---|
| JP | 59-164417 A | 9/1984 |
| JP | 2000-16039 A | 1/2000 |

*Primary Examiner* — James English
(74) *Attorney, Agent, or Firm* — Sughrue Mion, PLLC (57) ABSTRACT

Embodiments of the present invention may include an axle support structure. The axle support structure has front and rear axle supports, an axle, and a bearing. The axle supports are provided on a vehicle body member of an industrial vehicle and have respectively a support hole. The axle is arranged between the front and rear axle supports, and has a pair of center pins. Each of the center pins is rotatably supported by the support hole. The bearing is inserted from an entrance of the support hole to be fit-engaged with the support hole. The bearing is provided between at least one of the center pins and a hole surface of the support hole corresponding to that center pin. At an end portion of the support hole opposite to the entrance, there is formed a stopper portion for preventing the bearing from passing through the support hole.

8 Claims, 8 Drawing Sheets

(56) References Cited

U.S. PATENT DOCUMENTS

2014/0125026 A1* 5/2014 Wada et al. ............... 280/124.1
2014/0145409 A1* 5/2014 Wada et al. ............... 280/124.1

* cited by examiner

AXLE SUPPORT STRUCTURES FOR INDUSTRIAL VEHICLES

This application claims priority to Japanese patent application serial number 2012-242738, the contents of which are incorporated herein by reference.

BACKGROUND OF THE INVENTION

1. Field of the Invention

Embodiments of the present invention relate to axle support structures for industrial vehicles such as a forklift.

2. Description of the Related Art

Figure 15:
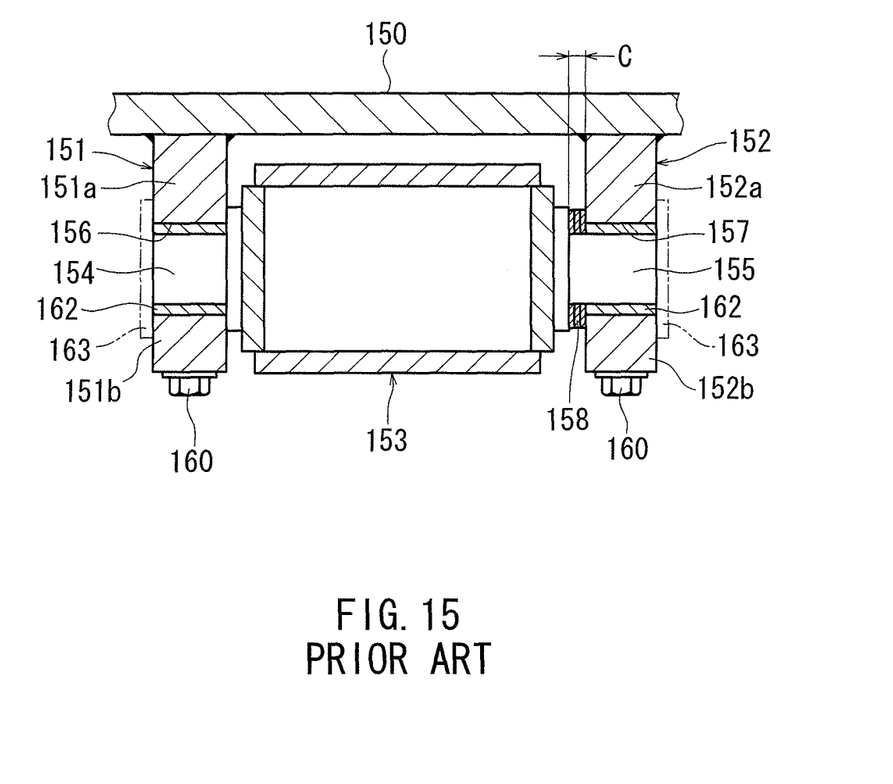
FIG. 15 is a cross-sectional view of an axle support structure according to a prior art.

A counterbalance type forklift has a machine base frame as a vehicle body member. The machine base frame is a rear frame of a machine frame. The machine base frame supports a rear axle so that the rear axle can swing within a roll plane. This helps to achieve an improvement in terms of a stability of the vehicle during traveling on a road surface that is not flat. FIG. 15 is a sectional view illustrating an industrial vehicle axle support structure.

As shown in FIG. 15, a machine base frame 150 is provided with front and rear axle supports 151 and 152 arranged in the longitudinal direction (the horizontal direction as seen in FIG. 15). The two axle supports 151 and 152 respectively have support holes 156 and 157. The axle supports 151 and 152 are of a divisional structure divided into two portions above and below the support holes 156 and 157. The axle supports 151 and 152 respectively include upper support members 151*a* and 152*a* and lower support members 151*b* and 152*b*. The upper support members 151*a* and 152*a* are fixed to the machine base frame 150 by welding or the like. The lower support members 151*b* and 152*b* are detachably mounted to the upper support members 151*a* and 152*a* by bolt means. The bolt means include headed bolts 160 and screw holes (not shown) provided in the upper support members 151*a* and 152*a*. The bolts 160 threadedly engage with the screw holes. A rear axle 153 is arranged between the axle supports 151 and 152. Front and rear center pins 154 and 155 are respectively provided on front and rear surfaces of the rear axle 153. The center pins 154 and 155 are respectively rotatably supported within the support holes 156 and 157 of the axle supports 151 and 152.

When the rear axle 153 is to be mounted to the machine base frame 150, the lower support members 151*b* and 152*b* are removed from the upper support members 151*a* and 152*a*. The center pins 154 and 155 of the rear axle 153 are arranged in the upper halves of the support holes 156 and 157 of the upper support members 151*a* and 152*a*. The lower support members 151*b* and 152*b* are respectively fastened to the upper support members 151*a* and 152*a* by the bolts 160. As a result, the lower halves of the center pins 154 and 155 are supported within the lower halves of the support holes 156 and 157. A bush 162 serving as a bearing is provided between each center pin 154, 155 and each inner surface of the support hole 156, 157. A detachment prevention plate 163 is fixed to one support member of each axle support 151, 152 by welding or the like. For example, the detachment prevention plate 163 is fixed to the lower support member 151*b* of the front axle support 151, and to the upper support member 152*a* of the rear axle support 152. Each detachment prevention plate 163 prevents the bush 162 from passing through the support hole 156, 157 to the side opposite the rear axle 153. A grease nipple (not shown) is attached to each upper support member 151*a*, 152*a*.

There may be dimensional variation in the machine base frame 150 and the rear axle 153. A clearance C for canceling effect of said variation is set between the axle support 151 or 152 and the rear axle 153. Thus, despite said variation, the rear axle 153 can be mounted between the axle supports 151 and 152. The clearance C may allow the rear axle 153 to rattle in the vehicle longitudinal direction. To prevent this rattling, the rear axle 153 is brought close, for example, to the front axle support 151. Shims 158 are arranged in the clearance C between the rear axle support 152 and the rear axle 153. The number of shims 158 is selected in response to the clearance C. Alternatively, a shim 158 of a thickness is selected in response to the clearance C.

Japanese Laid-Open Patent Publication No. 2000-16039 discloses an axle support structure having front and rear axle supports. Each axle support is of a vertically divisional structure. The each axle support has an upper support member fixed to a machine base frame, and a lower support member detachably attached to the upper support member.

The axle support structure has the detachment prevention plate 163. The prevention plate 163 is welded to each of the support members 151*b* and 152*a*. Thus, the number of components of the axle support structure is rather large. And a lot of production man-hours are involved. The axle is applicable not only to a forklift but also to various industrial vehicles such as a tractor shovel, a shovel loader, and a towing tractor. The various industrial vehicles have the axle swingably supported by a machine base frame.

Therefore, there is a need in the art for an axle support structure involving a smaller number of components and less production man-hours.

SUMMARY OF THE INVENTION

According to an aspect of the invention, certain embodiments of the present invention include an axle support structure. The axle support structure has front and rear axle supports, an axle, and a bearing. The axle supports are provided on a vehicle body member of an industrial vehicle and have respectively a support hole. The axle is arranged between the front and rear axle supports, and has a pair of center pins. Each of the center pins is rotatably supported by the support hole. The bearing is inserted from an entrance of the support hole to be fit-engaged with the support hole. The bearing is provided between at least one of the center pins and a hole surface of the support hole corresponding to that center pin. At an end portion of the support hole opposite to the entrance, there is formed a stopper portion for preventing the bearing from passing through the support hole.

Accordingly, it is possible to omit the conventionally needed detachment prevention plate. Or, there is no need to weld a detachment prevention plate to the upper or lower support member. As a result, it is possible to reduce the number of components required for bearing detachment prevention or to reduce the production man-hours.

In another aspect of the invention, at the end portion of the support hole opposite to the entrance, a jig opening may be provided. The jig opening exposes an end surface of the bearing. Thus, an extrusion jig is inserted into the jig opening from the side opposite to the axle, and the extrusion jig may press the end surface of the bearing. As a result, the bearing can be easily removed from the support hole.

In another aspect of the invention, the support hole may have a fit-engagement hole portion and a hollow hole portion. The hollow hole portion is arranged side by side with the fit-engagement hole portion so as to extend coaxially therewith. The hollow hole portion has a hole diameter smaller than a hole diameter of the fit-engagement hole portion. The stopper portion is formed by a difference in hole diameter between the fit-engagement hole portion and the hollow hole portion. Thus, an annular stopper portion can be easily formed. The annular stopper portion can receive the end surface of the bush in a well-balanced manner over the entire periphery thereof.

In another aspect of the invention, the hole diameter of the hollow hole portion is larger than an inner diameter of the bearing. A jig opening for exposing an end surface of the bearing is formed in the hollow hole portion. Thus, the annular jig opening can be easily formed. The extrusion jig may have at the distal end thereof an annular member configured to come into contact with the end surface of the bearing over the entire periphery thereof. As a result, the extrusion jig can press the bearing in a well-balanced manner.

In another aspect of the invention, the axle support structure has a bolt mechanism configured to detachably attach each of the axle supports to the vehicle body member. Thus, when one of the axle supports is damaged, it is possible to singly replace the damaged axle support without having to replace the vehicle body member.

DETAILED DESCRIPTION OF THE INVENTION

Each of the additional features and teachings disclosed above and below may be utilized separately or in conjunction with other features and teachings to provide improved axle support structures. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
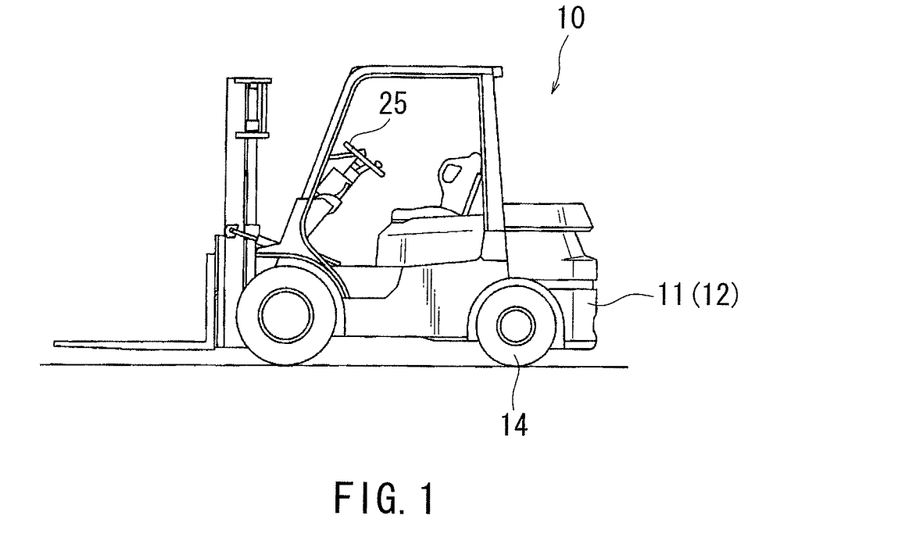
FIG. 1 is a side view of a forklift.
Figure 2:
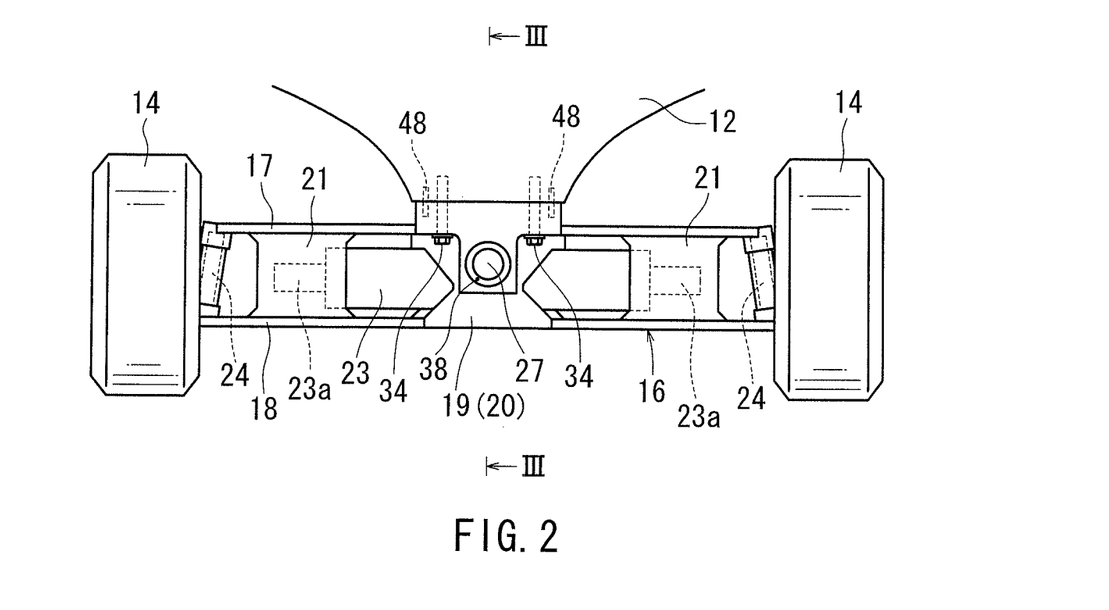
FIG. 2 is a front view of an axle support structure.

As shown in FIG. 1, the axle support structure is applicable to a rear axle of a counterbalance type forklift. The rear portion (the right-hand portion as seen in FIG. 1) of the vehicle body of a forklift (industrial vehicle) 10 includes a counterweight 11 and a rear frame (vehicle body member) 12. The rear frame 12 is formed as a block through casting. As shown in FIG. 2, on the lower surface of the rear frame 12, there is formed a space accommodating right and left rear wheels 14, a rear axle 16, etc.

Figure 3:
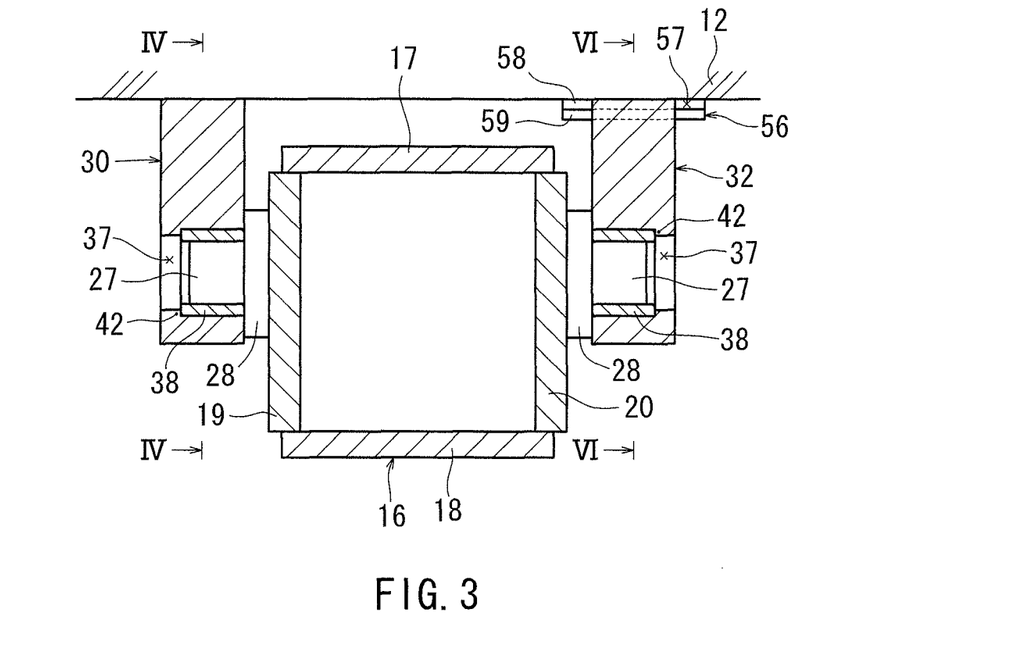
FIG. 3 is a cross-sectional view taken along line in FIG. 2.

The right and left rear wheels 14 are supported at both end portions of the rear axle 16. The rear axle 16 is equipped with an upper axle beam 17 and a lower axle beam 18. The axle beams 17 and 18 are strip-like and are arranged in parallel. The upper axle beam 17 is arranged on the upper side of the rear axle 16. The lower axle beam 18 is arranged on the lower side of the rear axle 16. As shown in FIG. 3, the upper axle beam 17 and the lower axle beam 18 are connected to each other by a front side connection plate 19 and a rear side connection plate 20. The connection plate 19 and 20 extend in the vertical direction at the center in the longitudinal direction of the rear axle 16, i.e., in the lateral direction of the vehicle. Accordingly, the sectional configuration of the central portion in the longitudinal direction of the rear axle 16 is of a rectangular frame-like configuration. As shown in FIG. 2, each end portion in the longitudinal direction of the upper axle beam 17 and the lower axle beam 18 is also connected by front and rear connection plates 21. Like the connection plates 19 and 20, the connection plates 21 extend in the vertical direction.

As shown in FIG. 2, steering cylinders 23 are accommodated in the rear axle 16. Each steering cylinder 23 has a piston rod 23a. The piston rods 23a are connected to the right and left rear wheels 14 via link mechanisms (not shown). When a steering wheel 25 of the forklift 10 shown in FIG. 1 is operated, the steering cylinders 23 shown in FIG. 2 are driven, and the rear wheels 14 are rotated around kingpins 24. As a result, the rear wheels 14 are steered.

As shown in FIG. 3, at the central portion in the longitudinal direction (the direction perpendicular to the plane of FIG. 3) of the rear axle 16, each of the connection plates 19 and 20 is provided with a center pin 27. One end portion (distal end portion) of each center pin 27 integrally has a mounting base plate 28. The mounting base plates 28 are respectively fixed to the connection plates 19 and 20 by welding or the like. The front and rear center pins 27 are arranged coaxially. The rear axle 16 swings around the two center pins 27. As a result, the rear axle 16 is permitted to swing in the roll direction of the vehicle body, with both rear wheels 14 (See FIG. 2) being held in contact with the ground.

Figure 4:
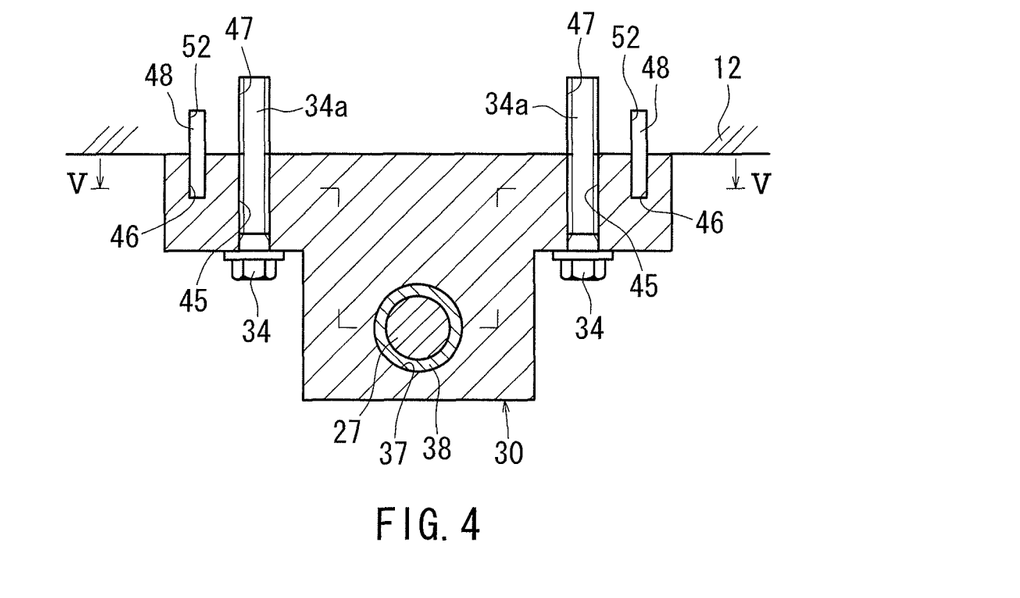
FIG. 4 is a cross-sectional view taken along line IV-IV in FIG. 3.
Figure 6:
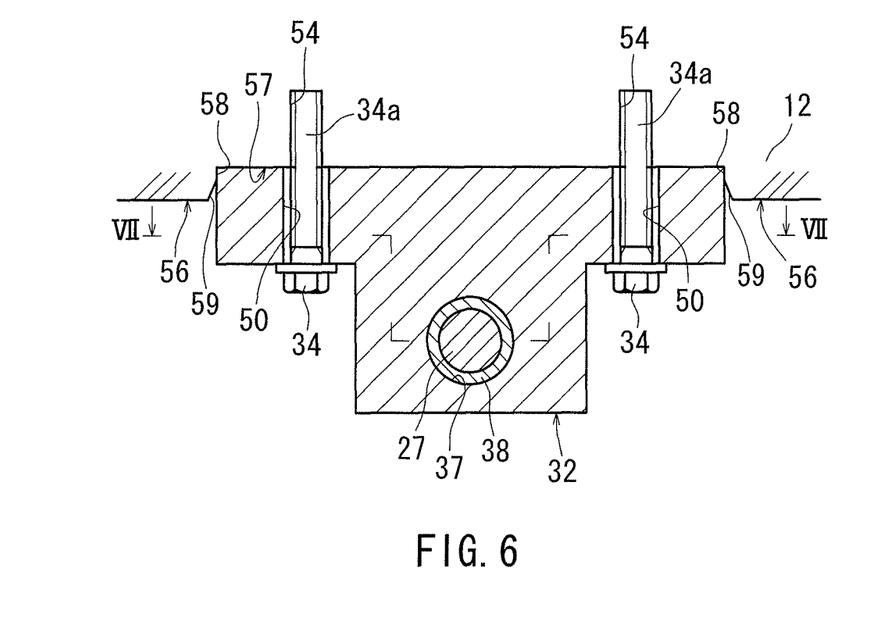
FIG. 6 is a cross-sectional view taken along line VI-VI in FIG. 3.
Figure 8:
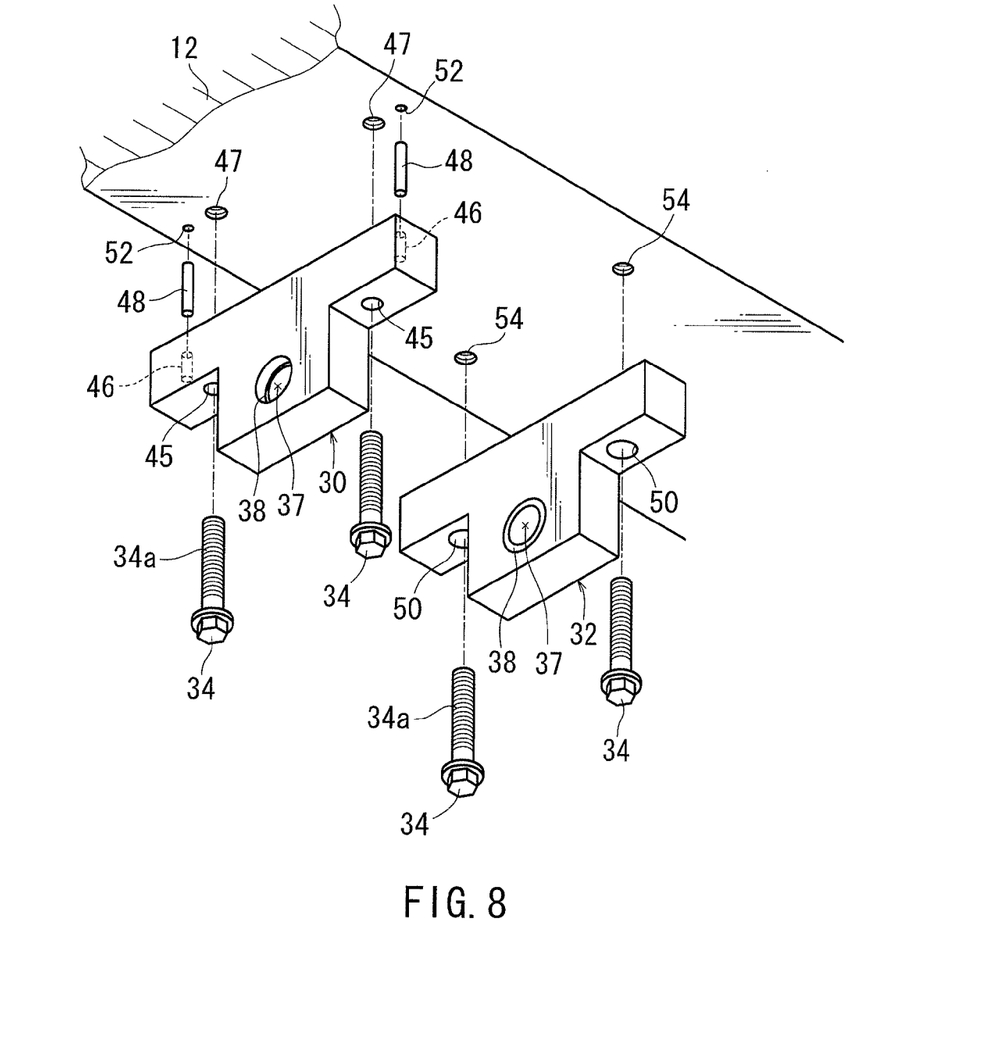
FIG. 8 is an exploded view of the axle support structure.

As shown in FIG. 3, the axle support structure comprises the rear axle 16 and front and rear axle supports 30 and 32. The front and rear axle supports 30 and 32 are provided on the lower surface of the rear frame 12. The front and rear axle supports 30 and 32 are spaced away from each other in the longitudinal direction of the vehicle. The lower surface of the rear frame 12 is formed as a horizontal or a substantially horizontal surface. The axle supports 30 and 32 are detachably mounted to the rear frame 12 by bolt means (bolt mechanism). As shown in FIGS. 4, 6, and 8, the bolt means has headed bolts (bolts) 34 and screw holes 47, 54 to be threadedly engaged with the bolts 34.

As shown in FIG. 8, the front axle support 30 is formed as a substantially T-shaped block as seen from the front side. The axle support 30 is formed, for example, by cutting an elongated T-shaped steel material in a predetermined thickness by fusion or the like. The upper end surface of the axle support 30 is held in contact with the lower surface of the rear frame 12. At the central portion of the axle support 30, there is formed a circular support hole 37 extending through it in the thickness direction, i.e., in the longitudinal direction of the vehicle. A resin bush (bearing) 38 of a cylindrical configuration is fit-engaged with or forced into the support hole 37. As shown in FIG. 3, the front center pin 27 of the rear axle 16 is rotatably supported within the support hole 37 via the bush 38.

Figure 9:
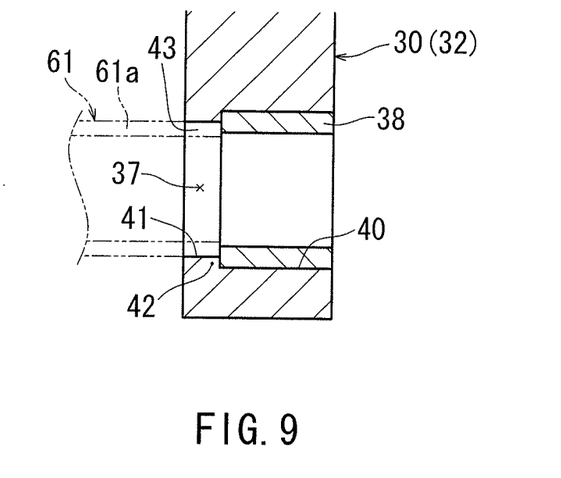
FIG. 9 is a cross-sectional view for showing a portion around a support hole.

As shown in FIG. 9, each support hole 37 has a fit-engagement hole portion 40, a hollow hole portion 41, and a stopper portion 42. The bush 38 is fit-engaged with the fit-engagement hole portion 40. The hollow hole portion 41 has a hole diameter smaller than the hole diameter of the fit-engagement hole portion 40. The hollow hole portion 41 is arranged side by side with the fit-engagement hole portion 40 so as to be coaxial therewith. The stopper portion 42 is formed between the fit-engagement hole portion 40 and the hollow hole portion 41. The stopper portion 42 serves to prevent the bush 38 fit-engaged with the support hole 37 from the rear axle side (the right-hand side as seen in FIG. 9) from passing through to the opposite side (the left-hand side in FIG. 9) of the support hole 37.

As shown in FIG. 9, the hole diameter of the hollow hole portion 41 is larger than the inner diameter of the bush 38. A jig opening 43 is formed in the hollow hole portion 41. The jig opening 43 exposes a portion of the end of the bush 38. The exposed portion is located along an inner circle end of the bush 38 and has an annular shape. The other portion is located along an outer circle end of the bush 38 and faces the stopper portion 42. Thus the stopper portion 42 stops the movement of the bush 38 (bearing detachment prevention structure). The exposed inner portion of the bush 38 may be contacted with an annular member 61a of an extrusion jig 61. Thus the bush 38 can be pushed out from the fit-engagement hole portion 40 by the annular member 61a.

Figure 5:
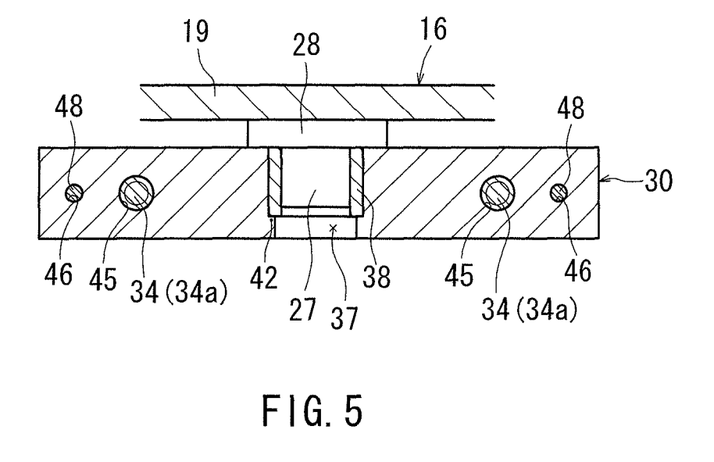
FIG. 5 is a cross-sectional view taken along line V-V in FIG. 4.

As shown in FIG. 8, at both right and left end portions of the axle support 30, there are formed right and left bolt insertion holes 45 extending in the vertical direction. As shown in FIGS. 4 and 5, the bolt insertion holes 45 are formed as hollow cylinders through which the shaft portions 34a of the bolts 34 can be passed. At both the right and left end portions of the upper end surface of the axle support 30, there are formed bottomed pin holes (lower pin holes) 46 in the form of hollow cylinders. The pin holes 46 are situated on the outer side of the bolt insertion holes 45. Knock pins 48 can be inserted into the pin holes 46.

As shown in FIG. 8, like the front axle support 30, the rear axle support 32 has a substantially T-shaped configuration as seen from the front side. The axle support 32 has a support hole 37 of a longitudinally symmetrical configuration with respect to the support hole 37 of the front side axle port 30. The bush 38 is fit-engaged with the fit-engagement hole portion 40 of each support hole 37. At both the right and left end portions of the axle portion 32, there are formed bolt holes 50 extending in the vertical direction. As can be seen from comparison of FIGS. 4 and 5 with FIGS. 6 and 7, the bolt insertion holes 50 have a hole diameter larger than the hole diameter of the bolt insertion holes 45 of the front axle support 30. The bolt insertion holes 50 are formed as hollow cylinders. The shaft portions 34a of the bolts 34 can be inserted into the bolt insertion holes 50 for loose fit-engagement with predetermined play. The axle support 32 has no pin holes 46.

As shown in FIG. 8, formed in the lower surface of the rear frame 12 are front side screw holes 47, upper side pin holes 52, and rear side screw holes 54. The front side screw holes 47 and the pin holes 52 are respectively situated in correspondence with the bolt insertion holes 45 and the pin holes 46 of the front axle support 30. The shaft portions 34a of the bolts 34 are threadedly engaged with the screw holes 47. The pin holes 52 are of a hollow cylindrical configuration. The knock pins 48 can be fitted into the pin holes 52. The rear side screw holes 54 are situated in correspondence with the bolt insertion holes 50 of the rear axle support 32. The shaft portions 34a of the bolts 34 are threadedly engaged with the screw holes 54.

As shown in FIG. 6, formed on the lower surface of the rear frame 12 are right and left guide protrusions 56 and a fit-engagement recess 57 (lateral direction positioning means or structure). The fit-engagement recess 57 is situated between the right and left protrusions 56. The upper end portion of the rear axle support 32 is fit-engaged with the fit-engagement recess 57. The fit-engagement recess 57 is formed as a shallow groove, which extends in a front-rear direction (in a direction perpendicular to the plane of FIG. 6). The guide protrusions 56 guide the position in the vehicle lateral direction of the axle support 32 when mounting the axle support 32 to the rear frame 12. The right and left guide protrusions 56 have a symmetrical configuration, and exhibit opposing surfaces mutually opposite each other. Each opposing surface has a positioning surface 58 and a guide slope 59. The positioning surfaces 58 are situated in the upper portion of the opposing surface. The positioning surfaces 58 face respectively upper right and left portions (positioning protrusions in the lateral direction) of the axle support 32. As a result, the positioning surfaces 58 determine the position in the vehicle lateral direction of the axle support 32. The guide slopes 59 are situated in the lower portions of the opposing surfaces. The guide slopes 59 are tapered so as to gradually and downwardly enlarge the groove width. A grease nipple (not shown) is attached to each of the axle supports 30 and 32. In FIG. 8, the rear axle 16, the guide protrusions 56, and the fit-engagement recess 57 are omitted.

As shown in FIG. 3, when mounting the rear axle 16 to the rear frame 12, the front side center pin 27 of the rear axle 16 is fit-engaged with the bush 38 within the axle support 30. The rear side center pin 27 of the rear axle 16 is fit-engaged with the bush 38 within the axle support 32. The lower portions of the knock pins 48 are fit-engaged with the pin holes 46 of the axle support 30. As shown in FIG. 4, the upper portions of the knock pins 48 protrude from the upper end surface of the axle support 30. As shown in FIG. 3, the rear axle 16 and the axle supports 30 and 32 are brought close to the rear frame 12.

As shown in FIG. 8, the tip end portions (the upper end portions) of the knock pins (positioning pins, or positioning protrusions) 48 are fit-engaged with the pin holes (positioning recesses) 52 of the rear frame 12 (horizontal direction positioning means or structure). As a result, the front axle support 30 is set in position in the horizontal direction, i.e., in the longitudinal and lateral directions with respect to the rear frame 12. The positions of the screw holes 47 and the positions of the bolt insertion holes 45 are aligned with each other. The bolts 34 are passed through the bolt insertion holes 45 to be threadedly engaged with the screw holes 47. Through loose threaded engagement of the bolts 34, the axle support 30 is temporarily fastened to the rear frame 12.

As shown in FIG. 6, the bolts 34 are passed through the bolt insertion holes 50 of the rear axle support 32 and are threadedly engaged with the screw holes 54. While fastening the bolts 34, the upper portion of the axle support 32 is fit-engaged with the fit-engagement recess 57 of the rear frame 12, i.e., between the guide protrusions 56. The guide slopes 59 of the guide protrusions 56 guide the upper right and left portions of the axle support 32 toward a positioning surface 58. As a result, the axle support 32 is set in position in the lateral direction with respect to the rear frame 12. Through loose threaded engagement of the bolts 34, the axle support 32 is temporarily fastened to the rear frame 12. At this time, the bolt insertion holes (longitudinal direction position adjustment means or structure) 50 form gaps between themselves and the shaft portions 34a of the bolts 34. The gaps allow movement in the vehicle longitudinal direction or positional adjustment of the rear axle support 32. The rear axle support 32 is situated at the rear of the rear axle 16 while exhibiting, for example, between itself and the rear axle 16 a gap of approximately the same size as that in the conventional example.

As shown in FIG. 4, through completely fastening the two front side bolts 34, the front axle support 30 is finally fastened or fixed to the rear frame 12. As shown in FIG. 3, the rear axle support 32 is moved to the front side of the vehicle (to the left as seen in FIG. 3) to adjust the longitudinal position of the axle support 32. The axle support 32 approaches the mounting base plate 28 provided on the rear side center pin 27. The gap between the mounting base plate 28 and the axle support 32 is adjusted to a predetermined amount. As shown in FIG. 6, the two rear side bolts 34 are completely fastened. As a result, the rear axle support 32 is finally fastened, i.e., fixed, to the rear frame 12. In this way, the rear axle 16 is mounted to the rear frame 12.

The rear axle 16 can be removed from the rear frame 12 by procedures reverse to those described above. Thus, when the sliding portion is worn through swinging of the rear axle 16, or when the mounting portion of the grease nipple is damaged, it is possible to replace the damaged axle support 30, 32 singly with a new one. Also when the bush/bushes 38 are damaged, it is possible to replace the bush/bushes 38 with new one/ones.

As shown in FIG. 9, when replacing the bush 38 with a new one, the bush 38 is extracted from the axle support 30, 32 by utilizing an extrusion jig 61. The extrusion jig 61 has an annular member 61a at the tip end portion. The annular member 61a is brought into contact with the stopper portion side end surface of the bush 38 all around the axle of the bush 38. The annular member 61a is inserted into a jig opening 43 of the support hole 37 from the side (the left-hand side in FIG. 9) opposite the axle side, and is brought into contact with the end surface of the bush 38. The extrusion jig 61 pushes the bush 38 in the detachment direction (to the right in FIG. 9). The bush 38 may be pushed out of the support hole 37 by the extrusion jig 61. Alternatively, the bush 38 may be extruded by a predetermined amount from the support hole 37 by the extrusion jig 61, and may be pulled out of the support hole 37 by a pull-out jig.

As shown in FIG. 4, the axle support structure of the forklift 10 has the bushes 38. Each of the bushes 38 is provided between the center pin 27 of the rear axle 16 and the support hole 37 of the axle support 30 or 32. The bush 38 is fit-engaged with the support hole 37 from an entrance of the support hole 37 located near the rear axle 16. Each of the axle support 30 or 32 has a stopper portion 42. The stopper portion 42 is formed at the end portion on the side opposite to the entrance in order to prevent the bush 38 from passing through the support hole 37. Accordingly, it is possible to omit the conventionally required detachment prevention plate for preventing bush detachment. It is also possible to omit the step of welding the detachment prevention plate to the upper or lower support member. As a result, it is possible to reduce the requisite number of components for preventing detachment of the bush 38. Or it is possible to reduce the production man-hours.

As shown in FIG. 9, each of the axle supports 30 and 32 has the support hole 37, the stopper portion 42, and the jig opening 43. The bush 38 is fit-engaged with the support hole 37 from the entrance located near the rear axle 16. The stopper portion 42 comes into contact with one end surface of the bush 38 within the support hole 37. Thereby the stopper portion 42 prevents the bush 38 from passing through to an exposed opening located opposite to the entrance. The jig opening 43 exposes one end surface of the bush 38 from the exposed opening. The jig opening 43 allows the extrusion jig 61 to push the one end surface of the bush 38. Accordingly, it is possible to insert the extrusion jig 61 into the jig opening 43 from the exposed opening, and to press the one end surface of the bush 38 with the extrusion jig 61. As a result, it is possible to easily detach the bush 38 from the support hole 37.

As shown in FIG. 9, the support hole 37 has a fit-engagement hole portion 40 and a hollow hole portion 41 which are arranged side by side so as to be coaxial in the axial direction. The bush 38 is fit-engaged with the fit-engagement hole portion 40. The hollow hole portion 41 has a hole diameter smaller than the hole diameter of the fit-engagement hole portion 40. The stopper portion 42 is formed by the difference in hole diameter between the fit-engagement hole portion 40 and the hollow hole portion 41. Thus, the annular stopper portion 42 can be easily formed by the fit-engagement hole portion 40 and the hollow hole portion 41. The annular stopper portion 42 can contact the one end surface of the bush 38 in a well-balanced manner i.e. all around the axle of the bush 38.

As shown in FIG. 9, the hole diameter of the hollow hole portion 41 is set to be larger than the inner diameter of the bush 38. The jig opening 43 is formed within the hollow hole portion 41. Accordingly, the annular jig opening 43 can be easily formed. The jig opening 43 opens the end surface of the bush 38 all around the axle of the bush 38. Thus, it is possible for the annular member 61a of the extrusion jig 61 to push the bush 38 in a well-balanced manner.

Instead of or in addition to the above-mentioned structure, the extrusion jig may have at the tip end portion thereof a plurality of leg-like members. The leg-like members may be brought into contact with the end surface of the bush 38 at equal peripheral intervals or in a dispersed fashion. It is possible for the leg-like members to press suitable portions of the end surface of the bush 38. It is also possible for the extrusion jig to have only one leg-like member. It is also possible to gradually push the bush 38 by the extrusion jig while gradually shifting the positions where the leg-like members 38 abut the bush 38.

When one of the axle supports 30 and 32 is damaged, the axle supports 30 and 32 are removed from the rear frame 12, and the damaged axle support 30, 32 is singly replaced with a new one. After this, the axle supports 30 and 32 are mounted to the rear frame 12. In this way, it is possible to replace solely the damaged axle support 30, 32, without having to replace the rear frame 12.

As shown in FIG. 9, the bush 38 is inserted into the support hole 37 from the entrance located near the rear axle 16. The jig opening 43 opens the end surface of the bush 38 from the exposed opening of the support hole 37. Thus, the bush 38 can be easily detached from the support hole 37 by utilizing the jig opening 43. When one of the bushes 38 of the axle supports 30 and 32 is damaged, the rear axle 16 is removed from the rear frame 12. It is possible to replace the damaged bush 38 with a new one, and mount the rear axle 16 to the rear frame 12.

As shown in FIGS. 4 and 5, a horizontal direction positioning means is provided between the front axle support 30 and the rear frame 12. The horizontal direction positioning means effects positioning horizontally the front axle support 30 with respect to the rear frame 12 at the time of mounting. The horizontal direction positioning means has the knock pins 48 and the pin holes 52. Thus, the front axle support 30 can be precisely mounted to a predetermined position on the rear frame 12.

Figure 7:
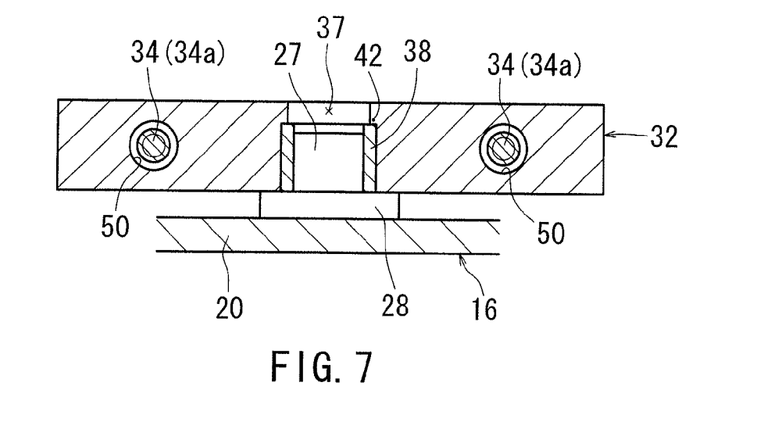
FIG. 7 is a cross-sectional view taken along line VII-VII in FIG. 6.

As shown in FIGS. 6 and 7, a longitudinal direction position adjustment means is provided between the rear axle support 32 and the rear frame 12. The longitudinal direction position adjustment means includes the bolt insertion holes 50 for adjusting the position in the vehicle longitudinal direction of the rear axle support 32 with respect to the rear frame 12 at the time of mounting. Thus, through the positional adjustment in the vehicle longitudinal direction of the rear axle support 32, it is possible to prevent rattling in the vehicle longitudinal direction of the rear axle 16. As a result, it is possible to omit the conventionally required shim adjustment operation. It is also possible to arrange shims between the mounting base plate 28 of the center pin 27 and the rear axle support 32 shown in FIG. 3. In this case, there is no need to select the number of shims, or the thickness of the shims, etc. due to the longitudinal direction adjustment means.

As shown in FIGS. 4 and 5, the horizontal direction positioning means has the knock pins 48 and the upper pin holes 52 to be fit-engaged with the knock pins 48. Thus, the horizontal direction positioning means can be formed easily and in a compact form.

As shown in FIGS. 6 and 7, the longitudinal direction position adjustment means is provided on the rear axle support 32. The longitudinal direction position adjustment means has the bolt holes 50 into which the bolts 34 are inserted so as to be movable in the vehicle longitudinal direction. Thus, the longitudinal direction position adjustment means can be formed easily and in a compact form.

As shown in FIG. 6, a lateral direction positioning means is provided between the rear axle support 32 and the rear frame 12. The lateral direction positioning means includes the fit-engagement recess 57 and a part of the axle support 32. The lateral direction positioning means adjusts the position in the vehicle lateral direction of the rear axle support 32 with respect to the rear frame 12 at the time of mounting. Thus, it is possible to mount the rear axle support 32 to the rear frame 12 with high precision in the vehicle lateral direction.

Figure 10:
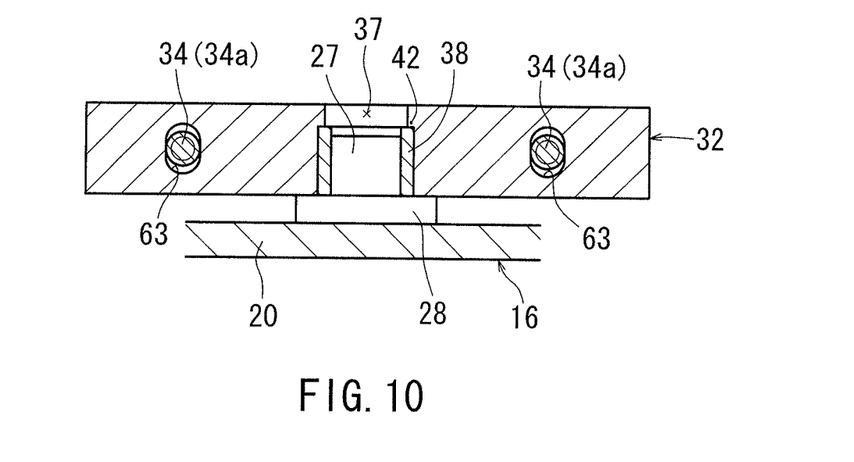
FIG. 10 is a cross-sectional top view of a rear axle support according to a second representative embodiment.

Instead of the structure of FIG. 7, the axle support structure may have the structure as shown in FIG. 10. Instead of the insertion holes 50 shown in FIG. 7, the rear axle support 32 shown in FIG. 10 has bolt insertion holes 63 (longitudinal direction position adjustment means, lateral direction positioning means). The bolt insertion holes 63 are of an elongated cylindrical configuration extending in the longitudinal direction. Gaps are formed between the wall surfaces of the bolt insertion holes 63 and the shaft portions 34a of the bolts 34. Due to the gaps, the rear axle support 32 is movable in the vehicle longitudinal direction. That is, the gaps allow positional adjustment of the rear axle support 32. The gaps are relatively small in the lateral direction. Thus, the position in the lateral direction of the rear axle support 32 with respect to the rear frame 12 can be determined by the bolt insertion holes 63. Accordingly, it is possible to omit the guide protrusions 56 and the fit-engagement recess 57 shown in FIG. 6.

Figure 11:
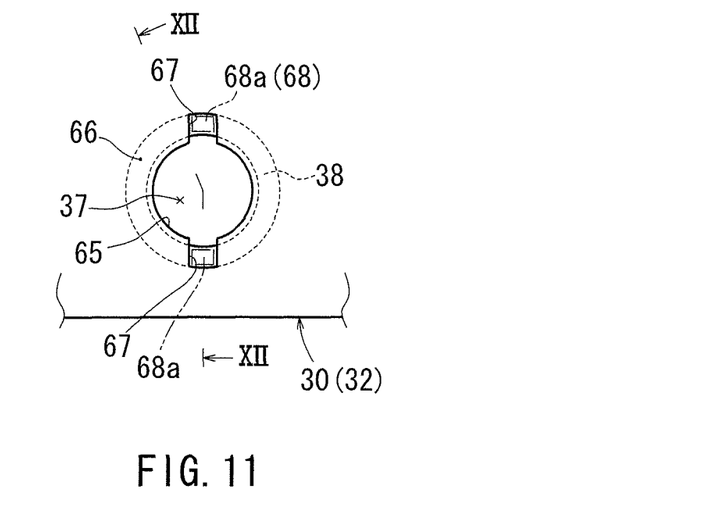
FIG. 11 is a front view showing a portion around a support hole according to a third representative embodiment.
Figure 12:
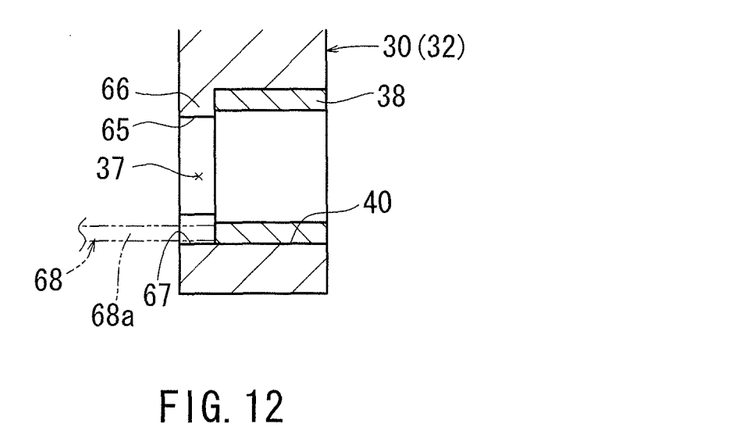
FIG. 12 is a cross-sectional view taken along line XII-XII in FIG. 11.

Instead of the structure as shown in FIG. 9, it is also possible for the axle support structure to exhibit the structure as shown in FIGS. 11 and 12. Instead of the stopper portion 42 and the jig opening 43 shown in FIG. 9, the support hole 37 shown in FIGS. 11 and 12 have a stopper portion 66 and jig openings 67. A hollow hole portion 65 of the support hole 37 has a hole diameter smaller than the inner diameter of the bush 38. A plurality of jig openings 67 are formed in the stopper portion 66. The jig openings 67 are U-shaped grooves on the inner surface of the support hole 37 and extend in the axial direction. The plurality of jig openings 67 are situated at equal or substantially equal peripheral intervals in correspondence with the end surface of the bush 38. The jig openings 67 have an outer peripheral edge of substantially the same configuration as the outer peripheral edge of the bush 38. An extrusion jig 68 may have a plurality of leg-like members 68a at the tip end. The leg-like members 68a may be inserted into the jig openings 67. The groove depth and the groove width of the jig openings 67 can be changed as appropriate. The smaller the hole diameter of the hollow hole portion 65, the further is it possible to prevent dust from passing through the hollow hole portion 65.

Figure 13:
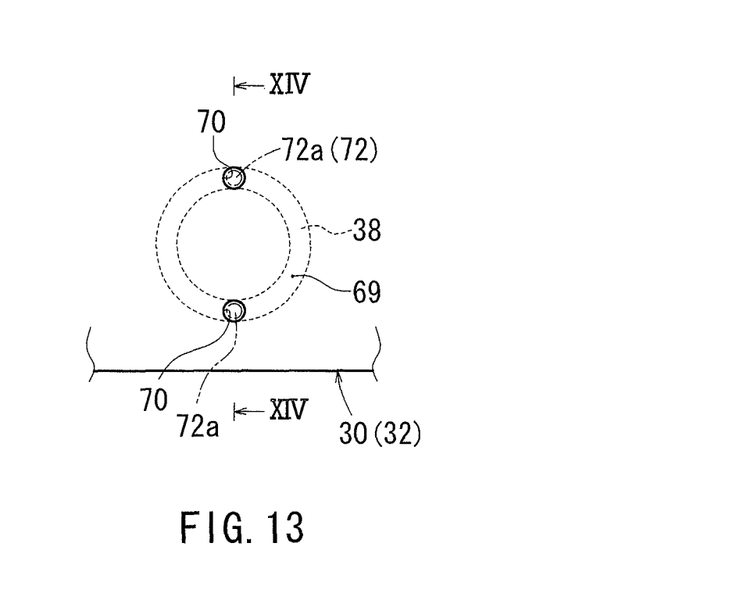
FIG. 13 is a front view showing a portion around a support hole according to a fourth representative embodiment.
Figure 14:
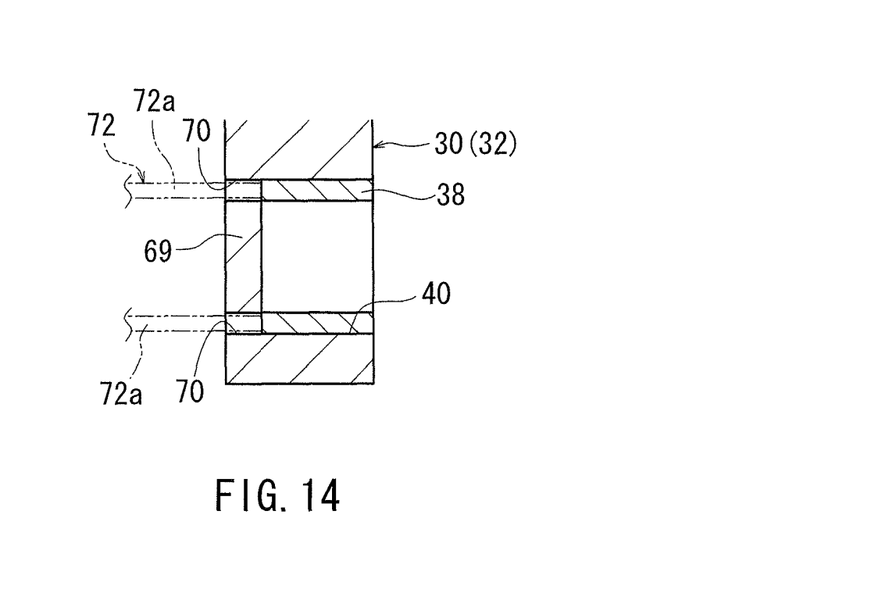
FIG. 14 is a cross-sectional view taken along line XIV-XIV in FIG. 14.

Instead of the structure as shown in FIG. 9, it is also possible for the axle support structure to have a structure as shown in FIGS. 13 and 14. Instead of the stopper portion 42 and the jig opening 43 shown in FIG. 9, for the axle support structure shown in FIGS. 13 and 14 has a stopper portion 69 and jig openings 70. The axle support structure has no hollow hole portion 41 shown in FIG. 9. The fit-engagement hole portion 40 has a bottom totally closed at one end of the hole portion 40. The stopper portion 69 has a plurality of jig openings 70. The jig openings 70 are hollow holes extending in the axial direction. The plurality of jig openings 70 are situated at equal or substantially equal peripheral intervals in correspondence with the end surface of the bush 38. The extrusion jig 68 may have a plurality of leg-like members 72a at the tip end. The leg-like members 72a may be inserted into the jig openings 70. The stopper 69 can prevent dust from entering the bush 38 into the hole portion 40.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The above-described axle support structure may be provided in the forklift 10, or may be provided in such industrial vehicles as a tractor shovel, a shovel loader, or a towing tractor.

The axle support structure may be provided in the rear axle 16, or in the front axle of an industrial vehicle such as a towing tractor.

Each axle support may consist of a single component like the axle supports 30 and 32. Alternatively, each axle support may have a divisional structure formed by upper and lower parts.

As described above, the axle support structure may be provided on the rear frame 12, which is a vehicle body member. Alternatively the axle support structure may be provided on the counterweight 11 of the machine base, which is a vehicle body member.

As described above, the bolt means may include the bolts 34 and the screw holes 47 and 54 shown in FIGS. 4 and 6. Alternatively, the bolt means may have a stud bolt provided on a vehicle body member, and a nut to be threadedly engaged with the stud bolt.

As shown in FIGS. 4 and 6, each of the axle supports 30 and 32 may be attached to the vehicle body member by a plurality of or a single bolt. For example, each of the axle supports 30 and 32 may be attached by two bolts 34, or by two left bolts and two right bolts.

As shown in FIG. 3, the axle support structure may have bushes 38 as the bearings. Alternatively, the axle support structure may have bearings such as ball bearings or needle bearings. It is also possible to omit the bearing of one of the axle supports 30 and 32.

The stopper portions 42, 66 and 69 of the support hole 37 may be provided in both or one of the front and rear axle supports 30 and 32. A conventional detachment prevention plate may be fixed to the axle support with no stopper portion by welding or the like.

The stopper portions 42, 66 and 69 of the support hole 37 are configured to prevent the bush 38 from passing through the support hole 37. The configuration, arrangement mode, etc. of the stopper portion may be changed as appropriate.

As shown in FIGS. 9 and 12 the hollow hole portions 41 and 65 of the support hole 37 may be coaxial with the fit-engagement hole portion 40. Alternatively, the hollow hole portions 41 and 65 may be located eccentrically with respect to the fit-engagement hole portion 40. As shown in FIGS. 9 and 12, the hollow hole portions 41 and 65 may be of a circular configuration. Alternatively, the hollow hole portions 41 and 65 may have a polygonal cross-section.

The jig openings 43, 67 and 70 of the support hole 37 may expose one end surface of the bush 38 from the exposed opening. The exposed opening is located opposite to the entrance locating near the rear axle 16. The configuration, number, arrangement mode, etc. of the jig openings can be changed as appropriate.

It is also possible to attach a cap, a cover or the like to the hollow hole portion 41, 65 of the support hole 37. The cap or the like is formed of resin and so on. The cap or the like is configured to close the exposed opening of the hollow hole portion 41, 65 to prevent dust from entering to the bush 38.

As shown in FIG. 4, the horizontal direction positioning means may be provided in the front axle support 30. Alternatively, the horizontal direction positioning means may be provided in the rear axle support 32. In this case, the longitudinal direction position adjustment means and the lateral direction positioning means may be provided on the front axle support 30 side.

Instead of the structure in which the knock pins 48 are fit-engaged with the upper pin holes 52, the horizontal direction positioning means may have a structure in which the knock pins 48 arranged on the rear frame 12 are fit-engaged with the lower pin holes 46. As shown in FIG. 4, it is possible to provide right and left horizontal direction positioning means. Alternatively, it is possible to provide one, three or more than three horizontal direction positioning means. The arrangement position of the horizontal direction positioning means may be changed as appropriate.

The horizontal direction positioning means may have the knock pins 48 and the upper pin holes 52. Alternatively, the horizontal direction positioning means may have a positioning protrusion provided on one of a vehicle body member and the front axle support 30, and a positioning recess provided in the other of these members.

The horizontal direction positioning means and/or the longitudinal direction position adjustment means are provided as needed. They may also be omitted.

As shown in FIG. 6, the lateral direction positioning means may have the fit-engagement recess 57 and a part of the rear axle support 32. Alternatively, the lateral direction positioning means may have a lateral direction positioning protrusion provided on one of the vehicle body member and the rear axle support 32, and a lateral direction positioning recess provided in the other of these members. The lateral direction positioning means is provided as needed, and may be omitted.

This invention claims:

1. An axle support structure for an industrial vehicle comprising:
   front and rear axle supports provided on a vehicle body member of the industrial vehicle, the front and rear axle supports having respectively a support hole;
   an axle arranged between the front and rear axle supports, the axle having a pair of center pins, each of the center pins being rotatably supported by the corresponding support hole;
   a bearing inserted from an entrance of the support hole to be fit-engaged with the support hole, the bearing provided between at least one of the center pins and a hole surface of the support hole corresponding to the at least one center pin, wherein the at least one center pin is inserted into the bearing; and
   a stopper portion adapted to prevent the bearing from passing through the support hole and integrally formed at an end portion of the support hole opposite to the entrance.

2. The axle support structure of claim 1, further comprising a jig opening that is provided at the end portion of the support hole opposite to the entrance and configured to expose an end surface of the bearing.

3. The axle support structure of claim 1, wherein the support hole comprises a fit-engagement hole portion fit-engaged with the bearing and a hollow hole portion arranged side by side with the fit-engagement hole portion so as to extend coaxially therewith, and
   wherein the hollow hole portion has a hole diameter smaller than a hole diameter of the fit-engagement hole portion so that the stopper portion is formed by a difference in hole diameter between the fit-engagement hole portion and the hollow hole portion.

4. The axle support structure of claim 3, wherein the hole diameter of the hollow hole portion is larger than an inner diameter of the bearing, and wherein a jig opening for exposing an end surface of the bearing is formed in the hollow hole portion.

5. The axle support structure of claim 1, further comprising a bolt mechanism configured to detachably attach each of the axle supports to the vehicle body member.

6. The axle support structure of claim 1, wherein the stopper portion is configured to allow the bearing to be inserted into the entrance of the support hole while the stopper portion is formed on the front and rear axle support.

7. The axle support structure of claim 1, further comprising a mounting base provided at one end portion of the at least one center pin and configured to cover one end of the bearing from the entrance of the support hole.

8. The axle support structure of claim 7, wherein the one end of the bearing faces the mounting base and another end of the bearing faces the stopper portion.

* * * * *